UNITED STATES PATENT OFFICE.

CURTIS C. MEIGS, OF PHILADELPHIA, PENNSYLVANIA, ASSIGNOR TO ELECTRO-CHEMICAL SUPPLY & ENGINEERING COMPANY, OF PHILADELPHIA, PENNSYLVANIA, A CORPORATION OF PENNSYLVANIA.

MANUFACTURE OF ACID AND WATER PROOF CEMENT.

1,252,013.  Specification of Letters Patent.  Patented Jan. 1, 1918.

No Drawing.  Application filed January 3, 1916. Serial No. 69,916.

*To all whom it may concern:*

Be it known that I, CURTIS C. MEIGS, a citizen of the United States, residing in Philadelphia, Pennsylvania, have invented certain Improvements in the Manufacture of Acid and Water Proof Cement, of which the following is a specification.

My invention relates to that method of producing an acid and water proof cement which consists in mixing crystalline silica with sodium silicate, the object of my invention being to so prepare such a cement as to insure a quick, uniform and permanent set of the same throughout all portions of the mass, thereby producing a body which is hard, dense and resistant throughout.

In the manufacture of silica-sodium silicate cements it has been found that the setting properties of the cement are enhanced by the addition of acid, even in such a small percentage as 1% or less, and I have further found that quick, uniform and permanent setting of the cement throughout all portions of the mass is insured if an acid reaction is produced in the mass by reaction upon an ingredient of the cement.

Preferably the production of the acid is effected by the action of water upon a salt combined with the silica, and as commercial sodium silicate contains a considerable percentage of water the latter may be relied upon for effecting the desired treatment of the salt for the production of the acid reaction. Different salts such as chlorids, nitrates, or sulfates of weak bases may be used in effecting the setting of the cement.

I claim:

1. As an improvement in the manufacture of acid and water proof cement by mixing silicious material and sodium silicate, the mode herein described of increasing the hardness and density of the cement, said mode consisting in adding to the silicious material a salt which, when acted upon by water, will produce an acid reaction.

2. As an improvement in the manufacture of acid and water proof cement by mixing silicious material and sodium silicate, the mode herein described of increasing the hardness and density of the cement, said mode consisting in adding to the silicious material, before the addition of the sodium silicate, a salt which, on said subsequent addition of the sodium silicate, will be acted upon by the water contained in the latter and will produce throughout the mass an acid reaction.

3. As an improvement in the manufacture of acid and water proof cement by mixing silicious material and sodium silicate, the mode herein described of increasing the hardness and density of the cement, said mode consisting in adding to the silicious material a chlorid which, when subsequently acted upon by water will produce a hydrochloric acid reaction.

4. As an improvement in the manufacture of acid and water proof cement by mixing silicious material and sodium silicate, the mode herein described of increasing the hardness and density of the cement, said mode consisting in adding to the silicious material before the addition of the sodium silicate a chlorid which, on the subsequent addition of the sodium silicate, will be acted upon by the water in the latter to produce throughout the mass a hydrochloric acid reaction.

In testimony whereof, I have signed my name to this specification, in the presence of two subscribing witnesses.

CURTIS C. MEIGS.

Witnesses:
 HENRY VOIGT,
 R. W. TAVEY.